(No Model.)

F. SIBLEY.
BUTTER HOLDER OR JAR.

No. 277,948. Patented May 22, 1883.

Witnesses

Inventor
Franklin Sibley

UNITED STATES PATENT OFFICE.

FRANKLIN SIBLEY, OF SUTTON, MASSACHUSETTS.

BUTTER HOLDER OR JAR.

SPECIFICATION forming part of Letters Patent No. 277,948, dated May 22, 1883.

Application filed April 18, 1883. (No model.)

*To all whom it may concern:*

Be it known that I, FRANKLIN SIBLEY, of Sutton, in the county of Worcester and Commonwealth of Massachusetts, have invented a new and useful Improvement in Butter Holders or Jars; and I do hereby declare that the following is a full, clear, and exact description of the invention, reference being had to the accompanying drawings, which form a part of this specification.

The object of my invention is to provide a holder or jar in which the butter, after being molded into one-pound lumps, can be deposited and kept closed therein by itself from the air or any odors liable to impregnate it, and in this manner taken to market and distributed to consumers in these jars, whereby it is kept sweet and fresh a long while, and when the butter is used up, the jars, being empty, can be returned to the dairy-men to be used for the same purpose again.

The novelty of my invention consists in constructing the holder or jar in two parts. The base or lower portion, in which the butter is placed, is about one-half the length of upper part, having one or more circular grooves formed round the outside, in which rubber bands are adjusted, in order to make the jar air-tight when the top or cover is placed thereon. The inside of this lower part is only deep enough to take in about one-half the length of the lump of butter. The cover or top part is made longer than the bottom part, to allow it to close on over the rubber bands and extend to near the bottom of the lower part, and also make room for the projecting portion of the butter in the upper part of it. An oval rim or band is formed on both the top and bottom parts to take hold of when the jar is to be opened. Butter put up in this way can be exhibited to show its quality very neatly without removing it from the jar, and also to slice from for the table as it may be wanted, and the cover replaced again, thus keeping it sweet, fresh, and good. Lump butter is usually marketed or distributed to families in boxes containing ten, twenty, or thirty lumps huddled together, and every time the box is opened the butter is all exposed to the air; but put up in my way the jars can be placed in a box and delivered to the consumers without exposing it to the air or heat. These holders or jars may be made of glass or any suitable material, but preferably glass.

Figure 1:
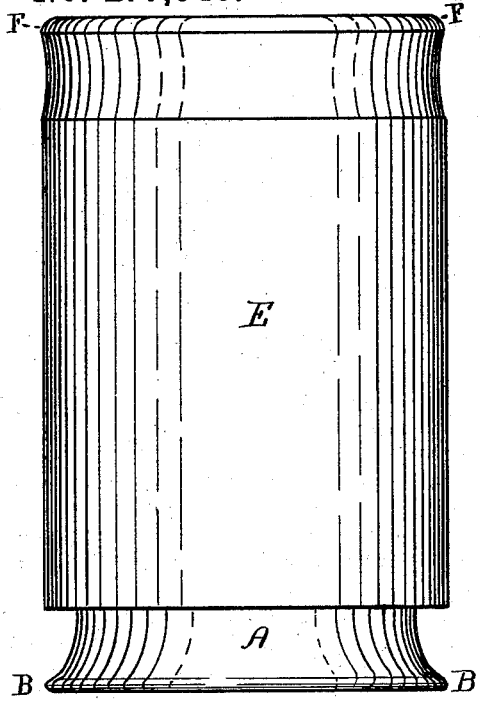
Figure 3:
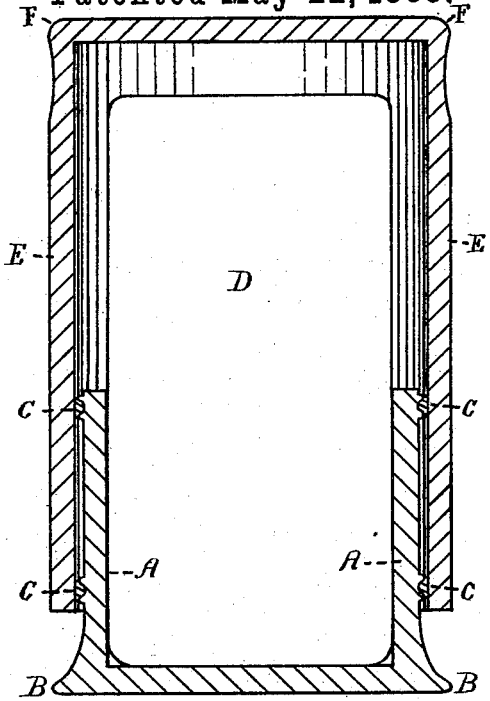
Figure 2:
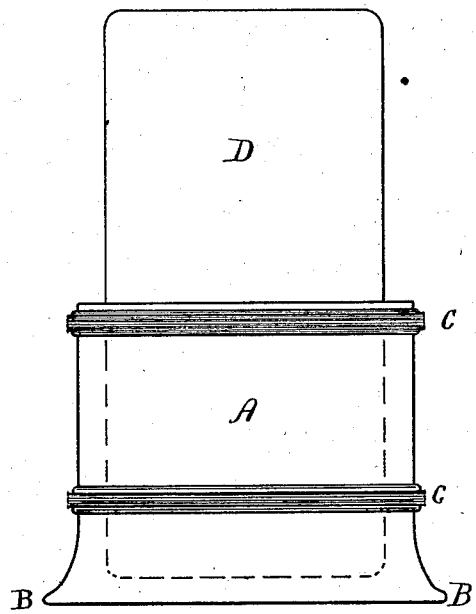

Referring to the drawings, Figure 1 represents an elevated side view of my holder or jar. Fig. 2 represents the lower portion, provided with two rubber bands, and also shows the manner in which the lump of butter appears with the cover taken off; and Fig. 3 represents a vertical sectional view, showing the interior, the butter inclosed therein.

A denotes the bottom portion; B, the oval rim, and C C the rubber bands adjusted in the circular grooves to keep the rubber in place; and D represents the lump of butter. E denotes the upper portion or part of the holder, which is the cover; and F, the projecting oval rim.

Having thus fully described my invention, what I claim, and desire to secure by Letters Patent, is—

As a new article of manufacture and use, a butter holder or jar constructed as herein described and shown, consisting of the upper part or cover, E, having the oval rim F, and of the lower portion, A, provided with the rubber bands C C, the oval rim B, and the inner cavity formed so the lump of butter D shall project above the rim and be inclosed in the upper part or cover, E, all substantially as shown, and for the purposes specified.

Signed and witnessed this the 10th day of April, A. D. 1883.

FRANKLIN SIBLEY.

In presence of—
JONA. LUTHER,
MIRICK H. COWDEN.